Jan. 6, 1931.   D. C. KLAUSMEYER   1,788,163
INDEX FOR MACHINE TOOLS
Original Filed May 5, 1925
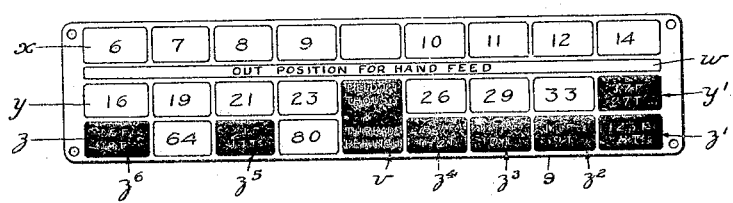
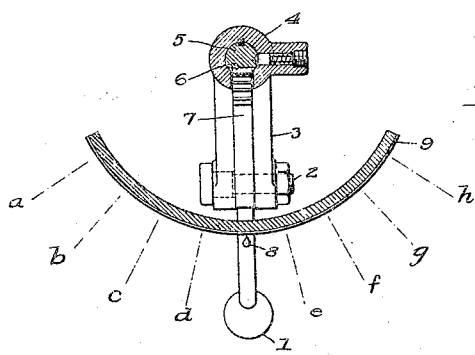
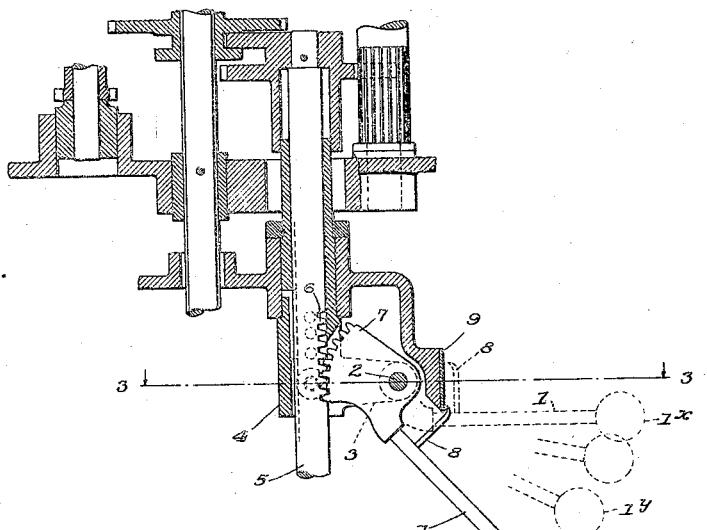
Inventor
David C. Klausmeyer
By Attorney
Albert F. Nathan Patented Jan. 6, 1931

1,788,163

UNITED STATES PATENT OFFICE

DAVID C. KLAUSMEYER, OF CINCINNATI, OHIO, ASSIGNOR TO THE CINCINNATI BICKFORD TOOL COMPANY, OF OAKLEY, CINCINNATI, OHIO, A CORPORATION OF OHIO

INDEX FOR MACHINE TOOLS

Original application filed May 5, 1925, Serial No. 28,214. Divided and this application filed January 15, 1927. Serial No. 161,413.

Various machine tools are adapted to perform a plurality of unlike tooling operations each of which may require a different rate of tool speed or feed. A drilling and tapping machine is a good example of a machine tool of this nature. When this type of machine is used for drilling the tool spindle is rotated at a relatively high rate and its axial feed per rotation is relatively small, whereas in tapping the speed of rotation is relatively low and the axial feed of the tool is relatively great.

In modern drilling machines as many as thirty-six spindle speeds are provided and as many as twenty-four changes are provided for the axial feed of the spindle. When drilling is to be performed the most efficient speed of rotation and rate of feed are determined by the size of the drill to be used, and the nature of the work to be drilled but the machine will, nevertheless, operate at variations of the most efficient rates and therefore accurate coordination is not essential between the speed and feed.

In tapping, however, the speed of rotation and the axial feed of the spindle must be accurately coordinated, inasmuch as holes are usually and preferably tapped with so-called "standard" threads which are predetermined in number per inch for various diameters. For example, the standard thread for a one-inch hole is eight threads per inch and the standard thread for a 2¾ inch hole is four threads per inch. Thus in the first instance, the axial feed of the tap must be approximately .125 inch per rotation, whereas in the last instance it must be about .250 inch per rotation. Very slight variations may be compensated for by a slight float in the tap holder.

The variations in drilling feeds are necessarily more numerous than the variations required for tapping and therefore only a small proportion of the available feeds are used as tap feeds, to wit;—those which correspond with the lead of standard taps.

To render available the required number and rates of feed, drilling and tapping machines are usually provided with speed change mechanisms which may be actuated by a manually shiftable lever (or levers) and an index is frequently provided which cooperates with the lever (or levers) to assist the operator in selecting the desired feed. It is important, especially in tapping, that the lever be positioned accurately to provide the feed corresponding to the lead of the tap to be used. It has been found, however, that where the index plate is all of the same general appearance and only the indicia thereon is different it becomes somewhat of a maze to the operator and he will sometimes inadvertently effect an undesired setting of the lever, and thereby the speed change devices, with the result that the spindle will not be fed at the intended and required rate. It will readily be perceived that when this occurs in tapping the rotation and feed of the spindle will not be coordinated with the lead of the thread on the tap and something must break. This invention has for an object to render available an improved index for machine tools which better will assist the operator in effecting the desired setting of the speed change mechanisms and which will tend to preclude dangerous errors in such settings by eliminating the maze-effect of the index and directing his attention especially to those settings which are vital for certain operations.

This object has been attained by the provision of an index for machine tools in which certain portions thereof are of a color in contrast with the color of adjacent portions whereby the operator's attention will, by a casual observance of the index, be attracted to those particular portions and he more easily may effect the proper setting of the control lever and with less likelihood of error.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure.

Figure 1 is a face view of an index plate having thereon indexes of contrasting colors in accordance with the present invention. Fig. 2 is a sectional view of a portion of a drilling and tapping machine with which the present index is particularly useful and showing the cooperation of the index with the feed-change control lever. Fig. 3 is a transverse section on the line 3—3 of Fig. 2, also showing the cooperation of the index with the control lever.

This application is a division of my pending application Serial No. 28,214 filed May 5, 1925, to which reference may be had for details of the feed change mechanism adapted to be actuated by the control lever to give a tool spindle axial feed at varying rates. For the purpose of this application it will suffice to say that all of the changes are effected by transverse movements of a hand lever 1, fulcrumed at 2 to a yoke 3, projecting laterally from a sleeve 4, rotatably journaled in a stationary framework. Splined within the sleeve 4 is a change gear control shaft 5 provided with a rack 6, permanently in mesh with a segment 7 on the lever 1. The change gear mechanisms are so constructed and arranged that rotation of the shaft 5, by horizontal movement of the hand lever 1 and sleeve 4, will effect eight speed changes, and axial movement thereof by vertical movement of the hand lever will multiply those eight speeds by three thus rendering available, for selective use, twenty four speed changes.

To enable the operator readily to select any one of the twenty-four available feeds I have provided an improved index which may be supported adjacent the control lever and which is adapted to cooperate with a pointer 8 carried thereby. This index comprises three horizontal rows $x$, $y$ and $z$ of indicia corresponding to the three vertical positions of the hand lever. Each of these three rows is divided into eight subdivisions corresponding to the eight horizontal positions of the hand lever. The eight effect horizontal positions of the hand lever 1 are indicated by dot-dash lines $a$, $b$, $c$, $d$, $e$, $f$, $g$ and $h$, in Fig. 3 and the three effective vertical positions thereof are shown at $1^x$ and $1^y$ and $1^z$ in Fig. 2.

It will readily be perceived that inasmuch as the lever 1 may be given universal movements the pointer 8 readily may be moved adjacent any one of the subdivisions on the index. The index may be applied to the machine in any desired way but preferably it will be placed upon a plate 9 which may be secured to a stationary part of the machine.

The twenty-four subdivisions of the index are each provided with suitable markings to indicate the results obtained by shifting the pointer to any one of those subdivisions. When the index is used in connection with spindle feed mechanism as above described this indicia may represent feeds in thousandths of an inch per rotation of the spindle.

As hereinbefore stated, these machine tools are used both for drilling and tapping and in order to tap a hole with a standard thread it is necessary that only a certain predetermined feed be employed. For example, inasmuch as the standard screw thread for a one-inch hole is eight threads per inch it is necessary, when tapping a hole of that diameter, that the tap be advanced one-eighth of an inch (or .125 inch) for each rotation thereof. In that case the lever 1 would be shifted to bring the tip of the pointer 8 into registry with the subdivision $z^1$ which is marked 125F indicating a feed of .125 inch per rotation of the tool spindle.

To enable the operator readily and without calculation to shift the gears to produce any available standard tap lead, those subdivisions which produce spindle feeds, corresponding to the various standard tap leads, also contain indicia to indicate that fact. For instance, the subdivisions $z^1$ also contains the marking $8^T$ which indicates that when the pointer is brought to that subdivision the gears will be so meshed as to tap eight threads per inch.

Still further to assist the operator in selecting the setting which produces the standard tap leads the subdivisions which indicate such settings are preferably of a color in contrast with the color of the subdivisions which do not indicate a standard tap lead and which are used primarily for drilling feeds. For example, the subdivisions $z^1$, $z^2$, $z^3$, $z^4$, $z^5$, $z^6$, $y^1$, and the instruction subdivision $v$ may have a background of black and the remainder of the subdivisions and the blank $w$ may have a background of red, but any other contrasting colors may be used. For convenience, the tap feed subdivisions are shown in black and the drill feed subdivisions shown in white, but it is to be understood that these colors are only representative. It is also to be understood that this invention also contemplates making the subdivisions of contrasting appearance other than by coloring.

Although this invention has been shown and described in connection with the tool feed of a drilling and tapping machine and the particular index illustrated is specific to those operations, it is perceived that this multi-colored index may be used to advantage in various other types of machine tools. It is therefore intended that the claims shall be construed to cover all such uses, in machine tools, for which the improved index is adaptable.

It will readily be perceived that, although simple in construction, an index of this nature will greatly assist the operator in securing the desired adjustment and will materially reduce breakage which heretofore has resulted from improper settings of the change gear control lever.

Having thus revealed this invention, I claim as new and desire to secure the following combinations and elements, or equivalents thereof, by Letters Patent of the United States:—

1. An index for drilling and tapping machines comprising a field divided into subdivisions; indicia in certain ones of said subdivisions designating tool feeds suitable for drilling and indicia in others of said subdivisions designating tool feeds suitable for tapping, the subdivisions designating the feeds for one of said operations being of a color in contrast with the color to the subdivisions designating the feeds for the other operation.

2. An index for drilling and tapping machines comprising a plurality of subdivisions; a single indicia mark, representing tool feeds in thousandths of an inch per rotation of the tool in certain ones of said subdivisions; and other indicia marks representing standard tap feeds in threads per inch in others of said subdivisions.

3. An index for drilling and tapping machines comprising a plurality of subdivisions; indicia in each of said subdivisions representing drilling feeds in thousandths per rotation of a drill; additional indicia in certain ones of said subdivisions representing feeds substantially corresponding to the lead of a standard tap, the subdivision containing the tap feeds indicia being of contrasting appearance with respect to the subdivisions having only drill feed indicia.

In witness whereof, I have hereunto subscribed my name.

DAVID C. KLAUSMEYER.